July 7, 1959

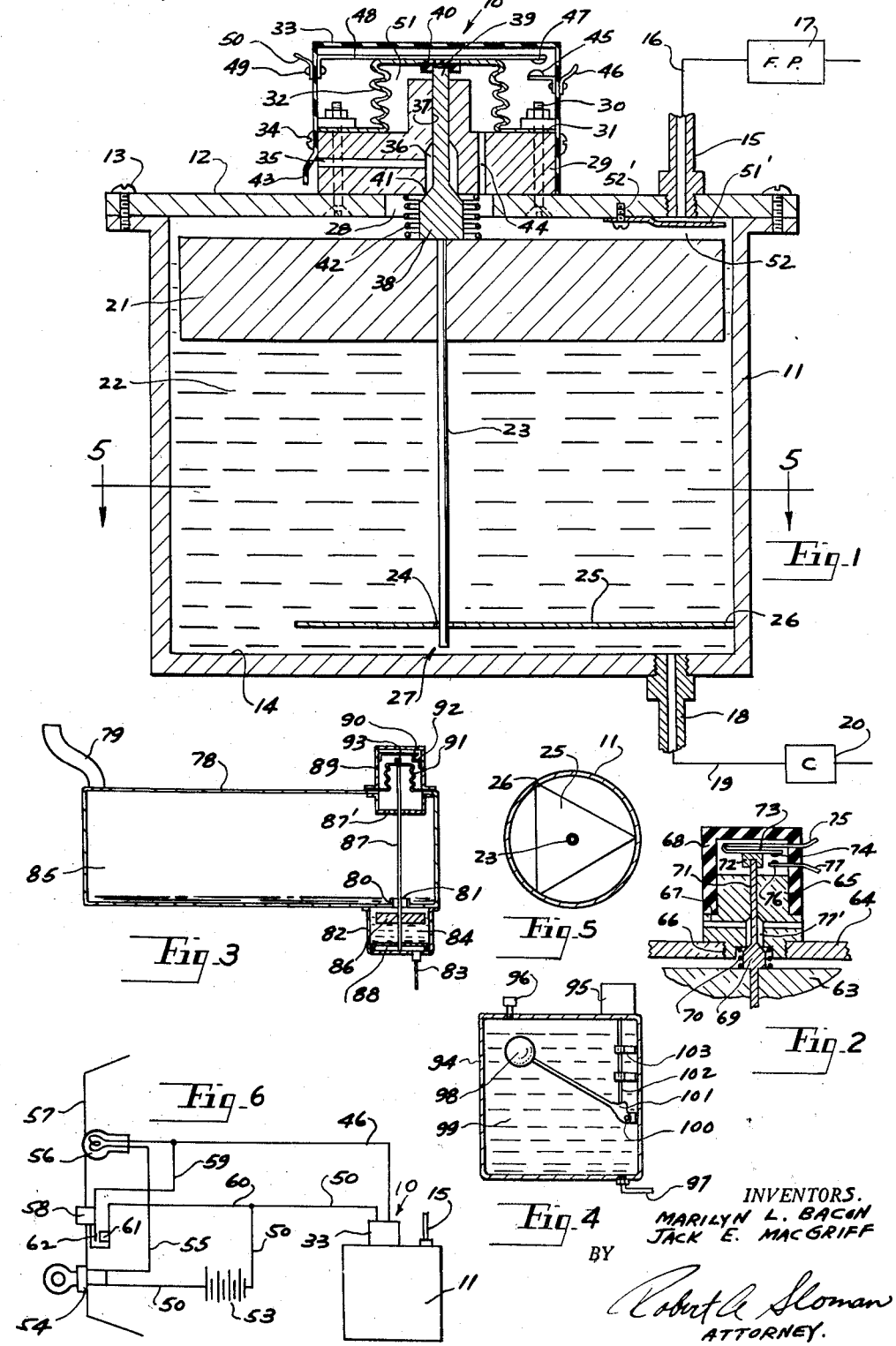

J. E. MacGRIFF ET AL 2,894,092

FLUID LEVEL INDICATOR

Filed Nov. 17, 1955

INVENTORS.
MARILYN L. BACON
JACK E. MACGRIFF
BY
Robert A. Sloman
ATTORNEY

United States Patent Office 2,894,092
Patented July 7, 1959

2,894,092

FLUID LEVEL INDICATOR

Jack E. MacGriff and Marilyn L. Bacon, Detroit, Mich.

Application November 17, 1955, Serial No. 547,424

6 Claims. (Cl. 200—84)

This invitation relates to a liquid level indicator and more particularly to an indicating device in conjunction with the fuel supply of a vehicle to provide a visible or audible dashboard indication when all of the fuel in the tank has been used.

This application is a continuation in part of our copending patent application, Serial No. 360,092, filed June 8, 1953 now Patent No. 2,777,030.

It is the primary object of the present invention to provide a novel construction of liquid level indicator which is in the form of a fluid container of such capacity as to store a sufficient amount of fuel which would normally permit continued driving of the vehicle over a reasonable pre-determined distance after all of the fuel has been utilized in the vehicle fuel tank.

It is the further object of the present invention in conjunction with said container to provide a fuel float which is responsive to the level of fluid in said container, which will be maintained full as long as the supply of fuel is not exhausted, but which upon complete use of the fuel in the storage tank will thereafter be used gradually, causing said float to move downwardly from its initial position and to thereby permit the closing of a pair of electrical switches arranged in an electrical circuit so that a small light or audible signal will be illuminated on the vehicle dashboard or an audible signal such as a buzzer. This will tell the driver that he must obtain gas within the next mile or so, depending upon the capacity of the storage container.

It is the further object of the present invention to provide in conjunction with the said container an air bleed and switch unit combined in such a fashion that as the float begins to move downwardly as where the vehicle engine is now using up the fuel in said container, there will be a simultaneous unseating of a valve which will permit the bleeding of air through the container so as to permit the continued flow of fuel from the said container into the vehicle carburetor.

It is the still further object of the present invention to provide a fluid level indicator which may be associated directly with the fuel tank and which will also have a float therein to indicate when the auxiliary container below the tank begins to empty and this float will control a switch unit for obtaining a visible or audible indication on the dashboard.

The primary invention pertains to a self-venting constant fluid level container between the main fuel tank and the engine. If the said container is between the main tank and the fuel pump, then there is a gravity feed to said container. On the other hand, if the auxiliary container is between the fuel pump and the carburetor, then in that case the said auxiliary container will be pressure fed from the said pump and must withstand that pressure and still be self-venting.

It is the further object of the present invention to provide for an auxiliary fuel container of such volumentary capacity as to provide for continued driving for several miles, and accordingly, provision within said auxiliary container a smaller float chamber in communication therewith, and wherein a float responds only to the change or fall of the fluid level to thereby operate an electrical or audible signal. This contemplates the situation where the auxiliary container is of increased size, with the result that road movements of the vehicle may cause sloshing of the fluid in the auxiliary container which would normally operate the switching mechanism and give an incorrect indication. The small float chamber, though in communication with the auxiliary chamber, would not have such sloshing of fluid, and accordingly, changes in the fluid level of a temporary nature such as in climbing a hill or in travelling over bumps would not effect an energization with a switching mechanism.

It still is the further object of the present invention to provide in conjunction with the auxiliary fuel container a flexible metal bellows which is vented thereinto, which will normally be expanded while the interior of the auxiliary chamber is under increased pressure, and which on failure of supply of fuel will act so as to effectively release fuel from the auxiliary container and avoid the building up of a vacuum.

These and other objects will be seen from the following specification and claims in conjunction with the appended drawings in which:

Fig. 1 is an elevational section of the present fluid level indicator diagrammatically illustrating the fluid connections between a source of fuel and a vehicle carburetor.

Fig. 2 is a fragmentary elevational section of a slightly different form of construction primarily illustrating the air bleed and switch unit and the control valve.

Fig. 3 is a fragmentary elevational section illustrating the application of the present indicator to a vehicle tank.

Fig. 4 is an elevational section of a slightly different form of a float construction and mechanism for operating the air bleed and switch unit.

Fig. 5 is a section on a reduced scale taken on line 5—5 of Fig. 1.

Fig. 6 is a fragmentary wiring diagram illustrating the electrical connections between the switch mechanism and an indicator on the vehicle dashboard.

Fig. 7 is an elevational section of a slightly different form of a fluid level indicator.

Fig. 8 is a fragmentary elevational section thereof on an enlarged scale illustrating the valve and air bleed and switch unit.

Fig. 9 is a bottom plan view of the float rod guide bushing shown in Fig. 8 taken on line 9—9.

Fig. 10 is a fragmentary elevational section of a portion of the illustration shown in Fig. 7 but showing the fluid inlet at the bottom of the tank.

Fig. 11 is still another variation of the illustration in Fig. 7 showing a common inlet and outlet for the auxiliary container; and Fig. 12 is a fragmentary elevational section of the structure shown in Fig. 7 and including an expansion bellows.

It will be understood that the above drawings illustrate merely a preferred embodiment of the invention, and that other embodiments are contemplated within the scope of the claims hereafter set forth.

Referring to the drawings, one form of the invention is shown in Figs. 1 and 5 wherein the fluid level indicator includes a closed cylindrical container 11 arranged in an upright position having a cover 12 secured thereover at 13 and having a bottom wall 14. Fluid inlet fitting 15 extends through and is joined to cover 12 and is connected by conduit 16, diagrammatically shown, to fuel pump 17. Auxiliary fuel outlet 18 is threaded into the bottom wall 14 of said container and is joined by conduit 19 to vehicle carburetor 20 diagrammatically illustrated.

The auxiliary container 11 will normally be substantially full of liquid such as gasoline 22 and will maintain a predetermined level as shown in Fig. 1 as long as there is a continued supply of gasoline from the fuel pump which will continue as long as there is gasoline in the tank and the motor is running.

There is provided within container 11 a vertically movable float 21 which extends substantially across the width of the container and is provided with a centrally arranged downwardly depending guide rod 23 which slidably extends loosely through central aperture 24 in guide plate 25 which is secured to the side walls of container 11 as at 26, Fig. 5.

Guide rod 23 is normally spaced from bottom wall 14 a short distance as indicated at 27, as this is all a downward movement which will be required of float 21 in order to permit closing of a pair of electrical contacts hereafter described.

Top wall 12 is apertured at 28 and mounted centrally over said top wall and said aperture is an air bleed and switch unit generally indicated at 10, and which includes a body 29 which is secured to plate 12 by the bolts 30.

A flexible metal bellows 32 is positioned above body 29 and has an annular outwardly projecting flange 31 at its lower open end secured to the top of body 29 by the same bolts 30. The body, as well as said bellows, are enclosed by an insulating cover 33 which is non-conductive to electricity and which is secured to said body as by the screws 34.

Said body has an upright aperture extending therethrough which terminates at its bottom portion in an enlarged air passage 36 which in turn terminates at its lower end in the valve seat formation 41 for cooperatively sealing valve 38 which is supported upon float 21 and movable therewith. There may be suitable coiled spring 42 interposed between said body and said float to facilitate downward movement thereof upon a falling of the fluid level within container 11.

The upper portion 37 of said aperture in the body is of reduced dimension and is adapted to slidably receive the stem 39 on said valve which projects above said body and engages the insulator 40 joined to the top wall of bellows 32.

There is provided a transversely arranged air inlet 35 which communicates with the outside atmosphere at one end and at its inner end joins air passage 36, there being provided a baffle formation 43 at the lower edge of cover 33 outwardly of the inlet of said air passage 35 to exclude foreign objects.

The interior chamber 51 of the flexible bellows is vented to the interior of container 11 by a passage 44 extending through body 29 and which communicates with opening 28 in the cover.

Secured upon the interior of cover 33 is a stationary contact 45 which is joined to the electrical wire lead 46 forming a part of the electrical circuit shown in Fig. 6 in the manner hereafter described.

There is also provided a second contact 47 which is normally spaced from contact 45 and which is carried by the flexible contact arm 48, which supportably rests upon bellows 32 and will move downwardly upon downward movements of said bellows, or in the absence of said bellows, will move downwardly upon downward movement of stem 39 and the insulator 40 which could just as well engage said arm 48 upon its under-surface entirely omitting said bellows.

The primary purpose of the bellows is to separate the contacts 45 and 47 from communication with chamber 11, and to respond to internal pressure within chamber 11.

The contact supporting arm 48 is also joined as by the rivet 49 to the interior of cover 33 and said rivet is joined to the electrical wire lead 50, also shown in wiring diagram of Fig. 6. It is apparent that upon failure of the supply of fuel in the main gasoline tank, the flow from the fuel pump 17 and through fitting 15 and the splash baffle 51' will be interrupted. This means that continued operation of the engine will begin to draw the fuel 22 in container 11. This will produce a downward movement of float 21 sufficient to permit downward movement of contact 47 until it engages contact 45 to close an electrical circuit in the vehicle dashboard 57 to either energize the bulb 56 or an electrical buzzer or other audible signal.

The primary purpose of deflector 51' is to prevent introduction of fuel from operatively engaging float 21, said deflector being secured to the interior of cover 12 as by the screw 52', the interior air space above the fuel in container 11 being generally designated by the numeral 52.

Referring to Fig. 6, assuming that there has been an initial withdrawing of fuel 22 from container 11, contacts 45 and 47 will close and the electrical circuit will be as follows: Lead 50 is connected with the vehicle battery 53, and said lead continues to the vehicle dashboard 57, joining the ignition switch 54 which, when on, establishes communication with lead 55 to the bulb 56, the circuit being completed through lead 46 from the bulb back to the switching unit 10.

There may be provided a test button 58 upon the dashboard for checking the electrical circuit to the bulb 56 even when there is plenty of gas in the main tank. Depression of button 58 moves contact 62 against contact 61 which joins lead 60 and lead 50 to the vehicle battery. Lead 50 through the switch 54 and lead 55 energizes bulb 56 and the circuit is completed through lead 59 back to the push button 58.

Referring to Fig. 2, there is shown a slight variation in the switch and air bleed unit 10 of Fig. 1, and this portion only is shown for illustration as a slightly more practical adaptation of units for manufacturing with pipe thread or gasket washer base 66 for the corresponding body 65, which is projected into the cover 64 of the auxiliary container and which provides a more compact construction than that shown in Fig. 1.

There is provided a float 63 similar to float 21, upon which is mounted valve 69 and with coiled spring 70 interposed between said body and said float normally urging the same downwardly against the buoyant forces of the fuel in the auxiliary container 64.

The valve stem 71 projects above said valve and slidably through an upright aperture which extends entirely through body 65 and carries above said body the insulator 72 engaging the bent leaf spring 73 carrying contact 74 which is joined to electrical wire lead 75, said contact being normally spaced from contact 76 which is joined to lead 77 and which is adapted for connection into an electrical circuit in the same manner as lead 46 in Fig. 6.

The upright aperture in body 65 terminates at its lower end in the enlarged air passage 77' which terminates at its lower end in a valve seat against which the valve 69 is normally seated closing off air communication to the interior of container 64.

There is provided in said body a transverse passageway 67 which extends therethrough and which communicates at its central portion with air passage 77', so that upon downward movement of float 63, unseating the valve, the auxiliary container 64 will be automatically vented to the outside atmosphere to thereby provide for draining of fuel from said container to the vehicle carburetor.

The air bleed and switch unit also includes the enclosing hollow insulating cover 68 which is mounted over the said body 65 and completely encloses the contacts 74 and 76.

A slight variation of the present invention is shown in Fig. 3 and wherein the fuel level indicating device is associated with the main fuel tank 78 of the vehicle whose interior chamber 85 normally stores the gasoline and which has standard filling pipe 79 which is normally closed, but vented.

There is provided at the bottom of tank 78 an outlet 80 whose opening 81 is slightly above the bottom of said tank and which is in communication with the auxiliary fuel storage container 82 and which is normally full of fuel as at 84 and supported therein the float 86 which responds to the level of fluid in container 82 and will fall as soon as the fuel 84 begins to be used up, after all the fuel has been used in tank 78, there being a suitable outlet conduit 83 at the bottom of container 82 adapted for connection in a conventional manner with the vehicle carburetor such as carburetor 20 in Fig. 1.

Guide rod 87 is secured to the float 86 and projects axially therebelow and through an aperture in the guide plate 88 at the bottom of said container. Said guide rod extends axially above said float and through a small guide opening in guide 87'. Housing 89 is mounted directly upon tank 78.

Said housing carries a movable contact 90 which is normally spaced from contact 92, also carried by said housing, there being also provisioned within said housing a flexible metallic bellows 91, whose interior is in communication with the interior 85 of the main tank 78. Centrally above said bellows is an actuator 93 which normally engages the contact arm for contact 90 for maintaining the same out of contact with contact 92 corresponding to a situation where container 82 is full and there is still fuel left within tank 78.

It is clear that just as soon as all of the fuel is used in tank 78 that fuel will begin to drain from container 82 and this will result in the float 86 moving downwardly until rod 87 engages the bottom wall of container 82 in the manner shown in Fig. 3 to thereby permit the contacts 90 and 92 to close for establishing an electrical circuit in the same manner as contacts 45 and 47, respectively shown in Fig. 1, and operating an electrical circuit the same as above already described in connection with Fig. 6.

Fig. 4 shows a slight variation in the construction of an auxiliary container 94 which has an air bleed and switch unit 95 of the same construction as above described in connection with the air bleed and switch unit 10 of Fig. 1.

Container 94 has a fuel inlet fitting 96 as well as an outlet 97 and within the fuel 99 in said container there is provided a float 98 upon the end of a pivotal arm which is pivoted as at 100 to the interior of said container.

Adjacent one end of said arm there is provided a cam surface 101 or suitable linkage upon which is supportably positioned the lower end of the valve operating rod 102 which is slidably positioned through the guides 103, and which extends to the valve within the air bleed unit 59 in the same manner as float 21 operatively engages valve 38 of Fig. 1.

As above described, as fuel begins to be used up within container 94, the float 98 will begin to fall, causing a corresponding downward movement of rod 102 and a similar movement of a valve similar to valve 38 for automatically venting container 94, which is necessary to permit the withdrawal of fuel therefrom after the supply through inlet 96 has been discontinued.

In some vehicles where it may be desired to provide a somewhat larger auxiliary fuel supply tank which will have such capacity as to permit driving for several miles, it appears that if the tank is of such size as to accomplish this result, the fluid level will vary slightly and the fluid will slosh around the tank in such manner as to permit energization of the switch contacts at a time when there actually is plenty of fuel and wherein no fuel has actually been withdrawn from the auxiliary container as in driving over rough surfaces or moving on an incline.

For this purpose there is provided in Fig. 7 an enlarged container 104 having a fuel inlet 105 at the top for illustration and an outlet 106 at its bottom, the normal fuel level being generally indicated at 107 during the normal pumping of fuel by the fuel pump through inlet 105.

There is provided across the interior of container 104 below said fluid level a splash baffle 108 which is provided with a series of apertures 109, and which is intended to minimize the sloshing movements of the fuel within said container.

Within container 104 there is provided a substantially smaller float chamber 110 which is secured within said container and with a portion thereof above the fluid level and having a series of air vents 111 to the interior of container 104.

Chamber 110 below the fluid level also has a series of drain holes 112 establishing communication with the fuel 104' and permitting a fluid level within said float chamber corresponding to fluid level 107.

Float 113 is positioned within chamber 110 and extends substantially across the width thereof and carries an upright guide 114 which projects below the float and extends through a corresponding aperture in the bottom wall of said chamber for maintaining the said float in an upright position. Float rod 115 is axially aligned with guide 114 and projects above said float and into the opening 116 in the guide bushing 117 which is secured within the aperture 118 Fig. 8, at the lower end of air passage 126 within the body 121 which forms a part of the air bleed and switch unit which is substantially similar to the corresponding air bled and switch unit 10, described in conjunction with Fig. 1, or the switch unit of Fig. 2.

The float 113 is preferably semi-circular in formation so that tipping of the container 104 and chamber 110 about a central axis will put more of the float under the level of a fluid with the result that the vent valve will not open. This is important because if more fluid enters float chamber 110 when the vehicle goes over a bump or on a hill, the level of fuel therein will be above the self-venting level for fluid in normal operation, and even though the fuel supply to the auxiliary tank is stopped, the float will not drop enough to allow the vent valve to open because of the partial vaccum formed in the top of the container.

Referring to Fig. 8, body 121 at its lower end terminates in the reduced threaded element 119 which extends through the top cover of tank 104 and threadedly engages the top wall of float chamber 110 and serves as a support therefor, there being a suitable gasket 120 interposed between body 121 and the top wall of tank 104.

There is provided an upright aperture which extends through body 121 and which includes aperture 118, air passage 126, and thereabove the reduced elongated passageway 122, through which is slidably positioned the valve rod 123 which carries at its lower end valve 124 and which is adapted to operatively engage valve seat 125 at the lower end of air passage 126 for normally closing off the interior of float chamber 110 from the outside atmosphere.

Said body also has a transverse slot 127 therethrough which centrally joins air passage 126 to establish air communication from the outside to the interior of float chamber 110 when valve 124 is unseated upon falling of float 113.

The relationship between the float 113 and valve 124 is slightly different from that shown in Fig. 1. In Fig. 8 the said valve 124 merely rests upon the upper end of float rod 115, and accordingly, upon downward movement of the float there will be a corresponding downward movement of valve 124 unseating the same and automatically providing air venting of chamber 110 and, of course, the auxiliary container 104 which is in communication therewith as at points 111 and 112.

A suitable lockwasher 128 is mounted upon the threaded extension 119 and interposed between tank 104 and chamber 110.

The switch unit includes the leaf spring support 129 which normally rests upon the upper end of valve rod 123 and carries the movable contact 130 normally spaced from stationary contact 151 which is joined to the wire lead 46, the same as the wire lead 46 shown in Figs. 1 and 6.

Leaf spring 129 is electrically connected with the wire lead 50 which corresponds to the correspondingly numbered lead in Figs. 1 and 6 to operate a light signal or an audible signal in the manner above described in detail.

The bushing or guide 117 which receives float rod 115 is provided at its sides with a series of annularly spaced upright air passageways 152 to thereby provide air communication between aperture 118 and the interior of float chamber 110.

Fig. 10 is a fragmentary variation of the structure shown in Fig. 7 and is merely to indicate that the fluid inlet 153 may be at the bottom of container 104 instead of at the top as at 105 in Fig. 7.

Fig. 11 indicates that the fluid inlet and outlet for tank 104 may be common as at 154 joining the container 155 which is fragmentarily shown, the lower end of the fitting 154 being in a T shape, so that fuel under pressure or otherwise flows into the fitting at 156 and out at 157 and the fuel-head is maintained in container 155 as indicated at 158 for illustration.

Fig. 12 illustrates merely a slight variation of the structure shown in Figs. 7 and 8 and shows additional structure for overcoming a difficulty which might exist where a pressure is established within auxiliary tank 104.

In some large auxiliary tanks, particularly under pressure, the fluid movement may make the fuel level rise above the self-venting level for the float. To overcome this there is provided upon the top of tank 104 a flexible metal bellows 159, whose interior 162 through the mounting fitting 160 establishes communication with the interior of tank 104, as by the air vent 161.

Upon the top of said bellows there is an axial guide rod 163 which loosely extends through an aperture in the guide 164 which extends over said bellows and which is anchored to the bellows or to tank 104 as at point 165 to thereby maintain said bellows in the upright position shown.

The air bleed and switch unit of Fig. 12 is the same as that above described in conjunction with Figs. 7 and 8, with one exception. The insulating arm 166 is joined to and projects laterally from the top of bellows 159 and is normally spaced slightly below leaf spring 129 for contact 130 to thereby prevent an accidental or unintentional downward movement of contact 130 until the pressure within tank 104 has fallen due to a discontinuance of the supply of pressure fluid which will cause a corresponding downward collapsing movement of bellows 159. Unless the bellows collapses, contact 130 cannot move downwardly even though the valve rod 123 might accidentally drop down due to a temporary dislodgement of the float 113.

The flexible metal bellows 159 is vented to the auxiliary tank 104 as at 161. Air under pressure within tank 104 will expand the said bellows, and this air under pressure will be effective for pushing fluid out of container 104 when it is no longer being supplied to the tank. In this connection, the fluid inlet to tank 104, as well as the exit, must be at the bottom of the said tank and below the fluid level, so that the top is always under pressure when the valve is closed and the pump working.

Having described our invention, reference should now be had to the claims which follow for determining the scope thereof.

We claim:

1. A liquid level indicator comprising a closed fluid container having a fluid inlet and outlet, a vertically movable float extending substantially across the width of said container, an air bleed and switch unit, including a body mounted upon said container having an upright aperture therethrough, a portion of which defines an air passage terminating in a valve seat in communication with the interior of said container, there being an air inlet in the body joining said air passage, a valve engaging and projecting above said float adapted to seat on said valve seat normally closing said air passage, and having a valve stem slidable through said aperture and above the body, and a normally open switch upon and above said body, including a pair of spaced closable contacts, the valve stem normally engaging one of said contacts at a predetermined fluid level in said container for maintaining said contacts in spaced relation, failure of the supply of fluid to said inlet with continued flow through said outlet causing a falling of said fluid level and downward unseating movement of said valve to permit closing of said contacts, and bleeding of air through said air inlet and passage venting further flow through said outlet, reactivation of said fluid supply to said fluid inlet adapted to cause filling of said container, excess air being bled out through said air passage and air inlet.

2. The liquid level indicator of claim 1, a centrally apertured guide extending across the interior of said container, and a rod centrally depending from said float slidable through said guide and normally spaced from the bottom of said container.

3. The liquid level indicator of claim 1, said switch unit including a hollow insulated member substantially enclosing said body and said switch, and supporting said contacts therein.

4. The liquid level indicator of claim 1, and a bellows within said switch unit mounted upon said body enclosing said valve stem and engaged thereby upon its interior, one of said contacts being supported upon said bellows and vertically movable therewith.

5. The liquid level indicator of claim 1, and a bellows within said switch unit mounted upon said body enclosing said valve stem and engaged thereby upon its interior, one of said contacts being supported upon said bellows and vertically movable therewith, there being a passage through said body establishing communication between the interiors of said bellows and container.

6. The liquid level indicator of claim 1, and a coiled spring interposed between said body and said float.

References Cited in the file of this patent

UNITED STATES PATENTS

| 1,115,712 | Miller | Nov. 3, 1914 |
| 1,323,113 | Sprangers | Nov. 25, 1919 |
| 1,392,652 | Muzzy | Oct. 4, 1921 |
| 1,406,196 | LaLonde | Feb. 14, 1922 |
| 1,745,031 | Scott | Jan. 28, 1930 |
| 2,214,008 | Boddy | Sept. 10, 1940 |
| 2,327,373 | Samiran | Aug. 24, 1943 |
| 2,524,274 | Samuels | Oct. 3, 1950 |